(12) United States Patent
Todd et al.

(10) Patent No.: US 7,494,630 B2
(45) Date of Patent: Feb. 24, 2009

(54) METHOD OF STRIPPING METALS FROM ORGANIC SOLVENTS

(75) Inventors: Terry A. Todd, Aberdeen, ID (US); Jack D. Law, Pocatello, ID (US); R. Scott Herbst, Idaho Falls, ID (US); Valeriy N. Romanovskiy, St. Petersburg (RU); Igor V. Smirnov, St.-Petersburg (RU); Vasily A. Babain, St-Petersburg (RU); Vyatcheslav M. Esimantovski, St-Petersburg (RU)

(73) Assignee: The United States of America as represented by the United States Department of Energy, Washington, DC (US)

( * ) Notice: Subject to any disclaimer, the term of this patent is extended or adjusted under 35 U.S.C. 154(b) by 946 days.

(21) Appl. No.: 10/602,654

(22) Filed: Jun. 25, 2003

(65) Prior Publication Data

US 2007/0189943 A1   Aug. 16, 2007

(51) Int. Cl.
*B01D 11/00* (2006.01)

(52) U.S. Cl. .............................. 423/8; 423/658.5; 423/2; 423/21.5; 423/24; 423/54; 423/63; 423/70; 423/112; 423/139; 423/157; 423/181

(58) Field of Classification Search ................... 423/6, 423/8, 3, 2, 21.5, 54, 63, 70, 112, 139, 157, 423/181, 658.5

See application file for complete search history.

(56) References Cited

U.S. PATENT DOCUMENTS

| | | | | |
|---|---|---|---|---|
| 3,753,900 A | * | 8/1973 | Moore | 210/711 |
| 4,285,918 A | * | 8/1981 | Gustafson | 423/228 |
| 6,258,333 B1 | * | 7/2001 | Romanovskiy et al. | 423/10 |

OTHER PUBLICATIONS

Hatmut Bruschke, 1995, Pure & Appl. Chem., vol. 67, No. 6, pp. 993-1002.*

* cited by examiner

*Primary Examiner*—Wayne A. Langel
*Assistant Examiner*—James Fiorito
(74) *Attorney, Agent, or Firm*—Julia Cook Moody; Paul A. Gottlieb

(57) ABSTRACT

A new method to strip metals from organic solvents in a manner that allows for the recycle of the stripping agent. The method utilizes carbonate solutions of organic amines with complexants, in low concentrations, to strip metals from organic solvents. The method allows for the distillation and reuse of organic amines. The concentrated metal/complexant fraction from distillation is more amenable to immobilization than solutions resulting from current practice.

8 Claims, No Drawings

METHOD OF STRIPPING METALS FROM ORGANIC SOLVENTS

CONTRACTUAL ORIGIN

The present invention was conceived and developed under a U.S. Government Contract awarded by the U.S. Department of Energy. The Government has rights in this invention.

PRIORITY CLAIM

Priority in this invention is claimed from Russian patent application 2002117843 filed Jul. 2, 2002.

BACKGROUND

1. Field of the Invention

This invention relates to a field of radiochemical technology, more specifically to radioactive waste reprocessing, and can be used for extraction recovery of metals.

2. Description of the Related Art

Ecological safety requires that long-lived radionuclides be transferred into forms preventing their distribution into the environment during storage. To reduce the volume of radioactive waste and thus to make its storage cost effective, the major radionuclides, e.g., cesium (Cs), strontium (Sr), and actinide elements (An) can be separated from stable elements (sodium, aluminum, etc.) Depending on specific requirements, it may be necessary to recover all the major radionuclides or certain fractions of them. The most common method for highly radioactive liquid waste (HAW) treatment is liquid-liquid extraction. The extraction process consists of the extraction operation whereby the radionuclides (An, Cs, Sr, etc.) are transferred into the organic phase and the stripping operation whereby the radionuclides pass back into an aqueous phase. The resultant strip product (aqueous radionuclide-containing solution) is thereafter subjected to immobilization, usually by vitrification. To reduce the volume of glass produced by vitrification, the salt content in the resultant strip product should be minimized.

The method for stripping uranium from the organic phase consisting of tributylphosphate in kerosene with the use of soda solution (e.g., $Na_2CO_3$) is known. See J. C. Mailer and O. K. Tallent, "A Review of Recent ORNL Studies in Solvent Cleanup and Diluent Degradation," paper presented at US/UK Exchange Meeting on Solvent Extraction Technology, Oak Ridge, Tenn., Oct. 25-28, 1982; and Goldacker, H. et al., Kerntechnik, v.18, p. 426 (1976). The method for stripping americium from the organic phase with the use of soda solution (e.g., $Na_2CO_3$) and complexant is known, see P. S. Dhami et al., Sep. Sci. Technol., v36(2), p. 325-335, (2001). The resulting strip products contains a considerable amount of sodium.

The methods for radionuclide stripping from organic solutions based on chlorinated cobalt dicarbollide (ChCoDiC) with synergistic additives are known. See J. Rais, S. Tachimori, P. Selucky and L. Kadecova, "Synergistic Extraction in Systems with Dicarbollide and Bidentate Phosphonates," Sep. Sci. Technol. 29 (2), 261-274, 1994; J. Rais and L. Kadlecova, "Method of the Extraction Isolation of Tervalent Lanthanides and Actinides from Aqueous Solutions," Czechoslovakian Patent 216,101 (November 1984); J. Rais, M. Kyrs, P. Selucky, "Method of the Extraction Isolation of Strontium from Aqueous Solutions," Czechoslovakian Patent 224,890 (October 1985); J. Rais, M. Kyrs, S. Hermanek, "Method of Sr Isolation from Aqueous Solution," Czechoslovakian Patent 153,993 (June 1974). Both $HNO_3$ and mixtures of $HNO_3$ with organic reagents like hydrazine nitrate, amine (methylamine, dimethylamine) nitrates, dimethylformamide, trimethylphosphate, etc. are also used as stripping solutions. By using all the proposed methods it is possible to obtain a strip product containing minimal salts of stable metals. However, the methods listed above give strip products containing considerable quantities of nitric acid or mixture of nitric acid and organic compounds that require destruction by additional chemical reagents or by oxidation at elevated temperature.

The claimed method is most similar to that for the stripping of cesium and other radionuclides from organic solution by a solution of guanidine carbonate and DTPA. See V. N. Romanovskiy, I. V. Smirnov, V. A. Babain, T. A. Todd, J. D. Law, R. S. Herbst, and K. N. Brewer, "The Universal Solvent Extraction (UNEX) Process I: Development of the UNEX Process Solvent for the Separation of Cesium, Strontium, and the Actinides from Acidic Radioactive Waste," Solvent Extraction and Ion Exchange, 19 (1), pp. 1-21 (2001). In accordance with the the method of stripping used in the UNEX process, the organic solution of 0.05-0.08 M ChCoDiC+0.007-0.02 M PEG-400+0.01-0.02 M diphenyl-N,N-dibutylcarbomoyl-phosphine oxide (CMPO) containing Cs, Sr, Am, and Pu, is brought into contact with the solution of 0.5-1.0 M guanidine carbonate+0.02-0.04 M diethylenetri-aminepenta-acetic acid (DTPA). In this case, the stripping distribution coefficients are 0.2-0.3 for Cs and below 0.01 for other metals.

The drawback of the UNEX method is that the resulting strip product contains considerable amounts of organic compounds: 90-200 g/L guanidine carbonate and 10-20 g/L diethylenetriaminepentaacetic acid (DTPA). For subsequent vitrification, the strip product can be preliminarily dried and the guanidine destroyed. The process of guanidine destruction requires large amounts of oxidizer and should be conducted with heating. Oxidizing and high-temperature unit operations, with highly radioactive solutions of the strip product, are complicated technical tasks, and raise safety issues.

While the UNEX process of stripping (and the UNEX process) is a viable extraction/stripping method for nuclear wastes that are acidic (due to presence of nitric acid), extraction systems based on alkylated cobalt dicarbollides in combination with PEG's are promising extractants for Cs and Sr recovery from highly basic nuclear waste solutions. See J. Rais, P. Selucky, N. V. Sistkova, and J. Alexova, "Extraction of $^{137}Cs$ and $^{90}Sr$ from Alkaline Solutions with High $NaNO_3$ Content with Tetrahexyldicarbollide," Sep. Sci. Technol. 34 (14), 2865-2886, 1999; R. M. Chamberlin and K. D. Abney, "Strontium and Cesium Extraction into Hydrocarbons Using Alkyl Cobalt Dicarbollide and Polyethylene Glycols", J. Radioanalytical & Nuclear Chem., Vol. 240, No. 2, 547-553, May 1999. Since the alkylated derivatives of cobalt dicarbollide used in the extraction of Cs and Sr from highly basic wastes are not stable in acidic medium, the necessity for stripping with basic solutions is mandatory. The claimed method of stripping is compatible with and applicable to use with these basic-side extraction systems.

BRIEF DESCRIPTION

This invention describes a method to remove metals, including radionuclides, actinides, and rare earth metals including uranium, cesium, strontium and all other metals (barium, iron, zirconium, molybdenum etc.) from an organic phase of a solution. The only limitation is the solubility of these metal carbonates in complexant containing solution. First, an organic solution containing metals to be stripped is contacted with an aqueous solution of a stripping agent, with or without a complexant, wherein the stripping agent comprises an organic amine carbonate solution. Second, the metals pass into the aqueous solution, after which the aqueous solution is evaporated. Third, the organic amine is distilled as an azeotropic solution with water. Fourth, carbon dioxide gas is bubbled through the organic amine to regenerate the organic amine carbonate. Fifth, the recovered and regenerated organic amine carbonate is recycled in subsequent stripping cycles. The novel stripping agent recycling feature of this invention results in a reduced consumption of organic reagents and a reduced strip product volume, thus rendering the stripping process simpler and less expensive.

Other objects, aspects, and advantages of the present invention will be pointed out in or will be understood from the following detailed description provided below.

DETAILED DESCRIPTION

It must be noted that, as used in the specification and the appended claims, the singular forms "a," "an," and "the" include plural referents unless the context clearly dictates otherwise. Thus, for example, reference to "an aromatic compound" includes mixtures of aromatic compounds, reference to "a pharmaceutical carrier" includes mixtures of two or more such carriers, and the like.

Ranges are often expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment.

In this specification and in the claims that follow, reference will be made to a number of terms which shall be defined to have the following meanings:

The term "actinides," as used herein, refers to the group of radioactive elements that includes uranium, neptunium, plutonium, americium, and curium.

The term "radionuclide" generally refers to any radioactive isotope, but as used herein refers more specifically to the radioactive isotopes of cesium and strontium, especially $^{137}Cs$ and $^{90}Sr$.

The term "rare earths" refers to the group of elements that includes lanthanum, cerium, praseodymium, neodymium, promethium, samarium, europium, gadolinium, terbium, dysprosium, holmium, erbium, thulium, ytterbium, and lutetium.

The term "transuranium" refers to a radioactive element having a higher atomic number than uranium, not found naturally, and produced by nuclear bombardment.

The present invention relates to development of a stripping method that enables the exclusion of salts and allows a significant decrease in the content of organic compounds in the strip product. Using a carbonate solution of organic amine or organic amine with a complexant as a stripping agent solves the stated problem. The method uses amines forming an azeotropic mixture with water, for example: methylamine, dimethylamine, morpholine, pyrolidine, and pyridine. Diethylenetriaminepentaacetic acid (DTPA), nitrilotriacetic acid (NTA) or oxyethylidenediphosphonic acid (OEDPA) may be used as complexants.

The concentration of organic amine carbonate in the stripping solution is in the range of 0.5-4.0 M, that of the complexant 0.002-0.03 M. The stripping operation is conducted by contacting this stripping solution with the metal-saturated organic phase. Metals pass from the organic phase into the aqueous phase. The obtained aqueous solution containing organic amine carbonate, complexant and stripped metal is recovered by distillation and regenerated. Thus, the regenerated amine is suitable for re-use in the stripping section and a minimal volume of aqueous solution containing metals and complexant are produced, which are novel features of this invention.

The preferred stripping agent is a carbonate solution of organic amine having the formula $(RNH_3^+)_2CO_3^-$ or $(R_2NH_2^+)_2CO_3^{31}$, where the amine can be, for example, methylamine $[CH_3NH_2]$, pyrrolidine $[C_4H_8NH]$, morpholine $[C_4H_8ONH]$, or dimethylamine carbonate $[(CH_3)_2NH]$. The preferred complexant, when used, is typically either diethylenetriaminepentaacetic acid (DTPA, $C_{14}H_{23}N_3O_{10}$), nitrilotriacetic acid (NTA, $N(CH_2COOH)_3$), or oxylidenediphosphonic acid (OEDPA, $C_2H_8O_7P_2$).

A particularly preferred embodiment is to place the metals to be stripped in an organic solution of chlorinated cobalt dicarbollide; a substituted polyethylene glycol [PEG, $R-O-(CH_2CH_2O)_nH$, where R=H, Aryl, Alkylaryl, n>6], for example SLOVAFOL-909 $[C_9H_{19}-C_6H_4-(OCH_2CH_2)_9-OH]$; diphenyl-N,N-dibutylcarbamoyl phosphine oxide [CMPO, $(C_6H_5)_2-PO-CH_2CON(C_4H_9)_2$] in phenyltrifluoromethylsulfone $(C_6H_5SO_2CF_3)$; and contact the organic solution with an aqueous mixture of methylamine carbonate and DTPA as a complexant.

Another particularly preferred embodiment is to place the metals to be stripped in an organic solution of chlorinated cobalt dicarbollide with a substituted polyethylene glycol (PEG), such as SLOVAFOL-909, and metanitrobenzotrifluoride [MNBTF, $CF_3(C_6H_4)NO_2$] and contact the organic solution with an aqueous mixture of methylamine carbonate and DTPA as a complexant.

Another particularly preferred embodiment is to place the metals to be stripped in an organic solution of chlorinated cobalt dicarbollide and nitrobenzene $[C_6H_5NO_2]$; and contact the organic solution with an aqueous mixture of pyrrolidine carbonate and DTPA as a complexant.

Another particularly preferred embodiment is to place the metals to be stripped in an organic solution of diphenyl-N,N-dibutylcarbamoyl phosphine oxide and phenyltrifluoromethylsulfone; and contact the organic solution with an aqueous mixture of morpholine carbonate and DTPA as a complexant.

Another particularly preferred embodiment is to place the metals to be stripped in an organic solution of different-radical phosphine oxide, for example, CYANEX® 923 or similar phosphineoxides, and dodecane; and contact the organic solution with an aqueous mixture of methylamine carbonate and DTPA as a complexant.

Another particularly preferred embodiment is to place the metals to be stripped in an organic solution of diphenyl-N,N-dibutylcarbamoyl phosphine oxide and phenyltrifluoromethylsulfone and contact the organic solution with an aqueous mixture of methyl amine carbonate.

Another particularly preferred embodiment is to place the metals to be stripped in an organic solution containing uranium nitrate in a mixture of tributyl phosphate (TBP, $PC_{12}H_{27}O_4$) and dodecane; and contact the organic solution with an aqueous mixture of dimethylamine carbonate.

As compared with the UNEX method, the proposed method also provides stripping of metals, including radionuclides, from organic phases with different compositions. The stripping agent is regenerated by distillation at atmospheric pressure, i.e., the amine is practically not consumed in the stripping process. Distillation of the resultant solution is facilitated by the absence of corrosion (constant weakly-alkaline medium); consumption of organic reagents per metal unit decrease by a factor of 10-15; strip product volume is reduced; the operations for utilization of the obtained strip product are simpler and cheaper. The following examples are given to illustrate the process of the invention:

EXAMPLE 1

A solution of 0.06 M ChCoDiC, 0.02 M substituted polyethylene glycol (PEG), such as SLOVAFOL-909; 0.02 M diphenyl-N,N-dibutylcarbamoyl phosphine in phenyltrifluoromethylsulfone containing $10^{-4}$ nitrate salts of metals (Cs, Sr, Eu) labeled by a radioisotope was contacted with 2 M methylamine carbonate+0.025 M DTPA for three minutes at 20° C. The standard procedure for radiometric determination of distribution coefficients was used. The distribution coefficients were 0.15 for Cs and below 0.01 for Sr and Eu. Upon distilling the aqueous phase, 95% of methylamine was recovered and regenerated.

EXAMPLE 2

A solution of 0.06 M ChCoDiC and 0.02 M substituted polyethylene glycol (PEG) SLOVAFOL-909, in metanitrobenzotrifluoride containing $10^{-4}$ M nitrate salts of metals (Cs and Sr) labeled by radioisotope was contacted with a solution of 2 M methylamine carbonate+0.025 M DTPA for three minutes at 20° C. The standard procedure for radiometric determination of distribution coefficients was used. The distribution coefficients were 0.15 for Cs and below 0.01 for Sr. Upon distilling the aqueous phase 95% of methylamine was recovered and regenerated.

EXAMPLE 3

A solution containing 0.06 M ChCoDiC in nitrobenzene containing $10^{-4}$ M of cesium nitrate labeled by radioisotope was contacted with 2 M pyrrolidine carbonate+0.025 M DTPA for three minutes at 20° C. The standard procedure for determination of distribution coefficients was used. The cesium distribution coefficient was 0.12. Upon distilling the aqueous phase, 95% of pyrrolidine was recovered and regenerated.

EXAMPLE 4

A solution of 0.02 M diphenyl-N,N-dibutylcarbamoyl phosphine oxide in phenyltrifluoromethylsulfone containing $10^{-4}$ M europium nitrate labeled by radioisotope and Am-241 tracers was contacted with a solution of 2 M morpholine carbonate+0.025 M DTPA for three minutes at 20° C. The standard procedure for radiometric determination of distribution coefficients was used. The distribution coefficients were below 0.01 for europium and americium. Upon distilling the aqueous phase, 95% of morpholine was recovered and regenerated.

EXAMPLE 5

A solution of 1.1 M different-radical phosphine oxide (POR) in dodecane containing 0.03 M uranium nitrate and Am-241 tracers was contacted with a solution of 2 M methylamine carbonate+0.025 M DTPA for three minutes at 20° C. The standard procedure for radiometric determination of distribution coefficients was used. The distribution coefficients were below 0:01 for uranium and americium. Upon distilling the aqueous phase, 95% of methylamine was recovered and regenerated.

EXAMPLE 6

A solution of 0.02 M diphenyl-N,N-dibutylcarbamoyl phosphine oxide in phenyltrifluoromethylsulfone containing $10^{-4}$ M uranium (VI) nitrate was contacted with a solution of 2 M methyl amine carbonate for three minutes at 20° C. The standard procedure for radiometric determination of distribution coefficients was used. The distribution coefficients were below 0.01 for uranium. Upon distilling the aqueous phase, 95% of methylamine was recovered and regenerated.

EXAMPLE 7

A solution of 0.06 M alkylated cobalt dicarbollide in phenyltrifluoromethyl sulfone containing $10^{-4}$ M cesium of Cs labeled by a radioisotope was contacted with 2 M methylamine carbonate for three minutes at 20° C. The standard procedure for radiometric determination of distribution coefficients was used. The distribution coefficients were 0.2 for Cs. Upon distilling the aqueous phase, 95% of methylamine was recovered and regenerated.

Accordingly, although a specific embodiment of the present invention has been described above in detail, it is to be understood that this is for purposes of illustration. Modifications may be made to the described method of stripping metals from organic solvents by those skilled in the art in order to adapt this method to particular applications.

We claim:
1. A method to remove metals from an organic phase of a solution comprising the steps of:
  a. contacting said organic phase with an aqueous solution of a stripping agent, wherein said stripping agent comprises an organic amine carbonate solution selected from the group consisting of methylamine, dimethylamine, morpholine, pyrolidine, and pyridine;
  b. recovering the amine of said amine carbonate solution by distillation;
  c. regenerating the amine carbonate solution;
  d. recycling said organic amine carbonate solution beginning with step a).
2. The method of claim 1 wherein
  a. said stripping agent is mixed with a complexant,
  b. said organic phase comprises chlorinated cobalt dicarbollide, substituted polyethylene glycol, diphenyl-N,N-dibutylcarbamoyl phosphine oxide, and phenyltrifluoromethylsulfone; and
  c. said organic amine carbonate solution comprises methylamine carbonate.
3. The method of claim 1 wherein
  a. said stripping agent is mixed with a complexant,
  b. said organic phase comprises chlorinated cobalt dicarbollide, substituted polyethylene glycol, and metanitrobenzotrifluoride; and
  c. said organic amine carbonate solution comprises methylamine carbonate.
4. The method of claim 1 wherein
  a. said stripping agent is mixed with a complexant,
  b. said organic phase comprises chlorinated cobalt dicarbollide and nitrobenzene; and
  c. said organic amine carbonate solution comprises pyrolidine carbonate.
5. The method of claim 1 wherein
  a. said stripping agent is mixed with a complexant,
  b. said organic phase comprises diphenyl-N,N-dibutylcarbamoyl phosphine oxide and phenyltrifluoromethylsulfone; and c. said organic amine carbonate solution comprises morpholine carbonate.

6. The method of claim 1 wherein
a. said stripping agent is mixed with a complexant,
b. said organic phase comprises dodecane and at least one different-radical phosphine oxide selected from the group consisting of trioctylphosphine oxide, dioctylmonohexylphosphine oxide, dihexylmonooctylphosphine oxide, and trihexylphosphine oxide; and
c. said organic amine carbonate solution comprises methylamine carbonate.

7. The method of claim 1 wherein
a. said organic phase comprises diphenyl-N,N-dibutylcarbamoyl phosphine oxide and phenyltrifluoromethylsulfone; and
b. said organic amine carbonate solution comprises methylamine carbonate.

8. The method of claim 1 wherein
a. said organic phase comprises uranium nitrate, tributyl phosphate, and dodecane; and
b. said organic carbonate solution comprises dimethylamine carbonate.

* * * * *